Figure 1:
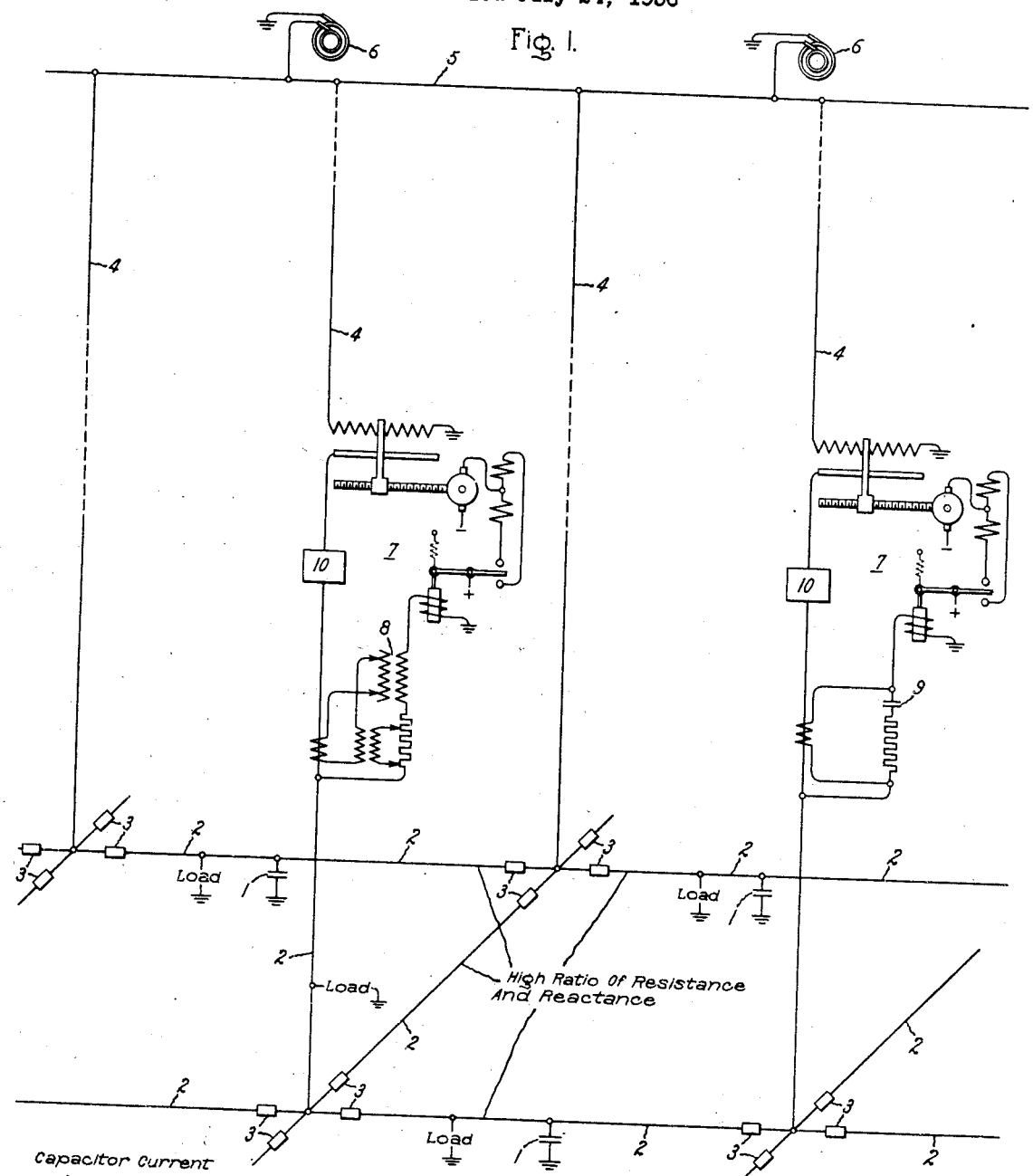

Aug. 31, 1937.  W. J. McLACHLAN  2,091,870
ELECTRICAL REGULATION
Filed July 24, 1936

Inventor:
Willard J. McLachlan,
by Harry E. Dunham
His Attorney.

Patented Aug. 31, 1937

2,091,870

UNITED STATES PATENT OFFICE 2,091,870

ELECTRICAL REGULATION

Willard J. McLachlan, Scotia, N. Y., assignor to General Electric Company, a corporation of New York Application July 24, 1936, Serial No. 92,380

4 Claims. (Cl. 171—119)

My invention relates to electrical regulation and more particularly to improvements in automatic voltage regulation of medium voltage network type alternating current electrical distribution systems.

Patent No. 2,046,990 issued July 7, 1936, on an application of Charles A. Woodrow and assigned to the assignee of the present application relates to an automatic current compensated voltage regulating arrangement for network type alternating current distribution systems which automatically tends to raise the network voltage in response to normal relatively high power factor lagging load current in the network feeder circuits and which tends to lower the voltage in response to relatively low power factor lagging current circulating in the parallel feeders. The raising action is to compensate for the normal voltage drop in the feeders and the lowering action is to eliminate circulating current in the feeders. Circulating current is caused by unequal feeder voltages and is lagging in the high voltage feeder.

I have found that when such an arrangement is used with some medium voltage networks that there is not proper discrimination between load and circulating current. Upon investigation I found that the reason for this is due to the relatively high ratio of resistance to reactance of the conductors of such networks. This high ratio so raises the power factor of the circulating current that it does not lag sufficiently behind the normal lagging load current.

In accordance with my invention I solved the above problem by connecting one or more shunt capacitors (static electrical condensers) to the network. The very low power factor leading current drawn by these capacitors combines with the lagging load current to produce a resultant current of relatively high power factor but, due to the shunt as opposed to a series connection of the capacitors, the capacitor current does not combine with the circulating current. The result is that the difference in power factor between the circulating current and the load current is increased enough to insure proper discriminatory action by the regulating means.

An object of my invention is to provide a new and improved regulated electrical distribution system.

Another object of my invention is to provide an improved voltage regulating system for network distribution systems which discriminates properly between load current and circulating current.

My invention will be better understood from the following description taken in connection with the accompanying drawing and its scope will be pointed out in the appended claims.

Figure 2:
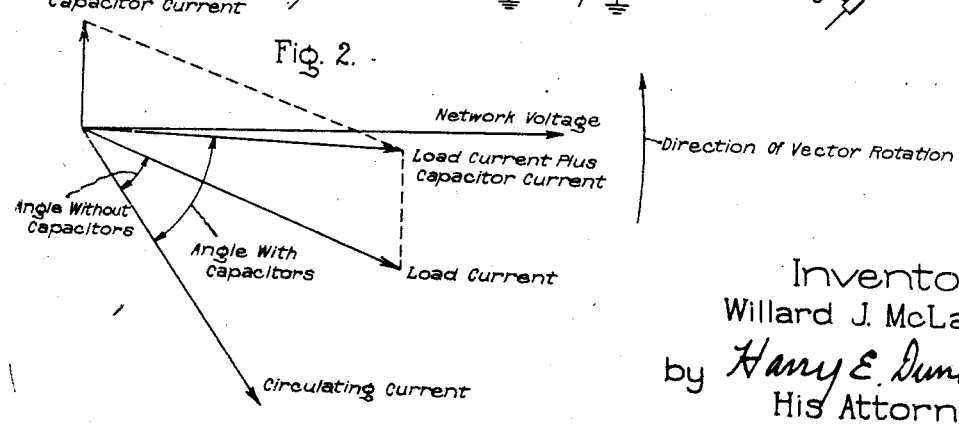

In the drawing, Fig. 1 is a diagrammatic showing of a system embodying my invention and Fig. 2 is a vector diagram for explaining its operation.

Referring now to the drawing and more particularly to Fig. 1, the circuit differs from that of the Woodrow patent by the addition of capacitors 1. These capacitors are connected in shunt to a network of conductors 2 having a high ratio of resistance to reactance. Each of these conductors 2 may be isolated from the others by means of circuit breakers 3 controlled by well known fault-responsive protective relay means (not shown) forming no part of this invention. This network is energized by feeder circuits 4 connected to a high voltage bus 5 which is fed by one or more generators 6. The bus voltage is stepped down to the regulated network voltage by means of typical automatic transformer voltage regulators 7. These regulators are provided with line drop compensators having conventional resistance elements but having negative reactance elements which may be either a reversed inductive reactance element 8 or a capacitive reactance element 9. With relatively high power factor current flowing through the feeder circuits the resistance elements operate in the usual manner to bias the regulators so as to cause them to raise the voltage and compensate for the voltage drop in the feeders. The reactance elements are relatively insensitive to relatively high power factor currents. However, for relatively low power factor currents the resistance elements are relatively insensitive and the negative reactance elements act to cause the regulators to lower the voltage when the low power factor current is lagging. This lowering action acts as an effective means for eliminating circulating currents which tend to flow in a loop circuit comprising two feeders and the sections of the network and the bus between these feeders whenever the voltages of the regulating transformers of the feeders are unequal.

As the circulating current does not do any useful work it is of relatively low power factor and will be lagging with respect to the feeder circuit whose regulating transformer is at the higher voltage and will be leading with respect to the feeder voltage whose regulating transformer is at the lower voltage. The higher the resistance of the network conductors relative to their reactance the higher the power factor of the circulating current.

The operation of my invention can best be understood by reference to the vector diagram in Fig. 2. In this diagram the horizontal vector represents the voltage of the network. The low power factor current lagging this voltage by the largest angle represents the circulating current in a feeder circuit the voltage of whose regulating transformer is higher than it should be. The next most lagging current vector represents the normal load current in that feeder. When the capacitor current, which is represented by the vertical vector, is added to the normal load current the phase angle of the combined capacitor and load current is relatively small and the power factor of this combined current is very high. As shown in the diagram, the addition of the capacitor current to the load current substantially doubles the angle between the circulating current and the normal current in the feeder. By varying the size of the capacitor this angle may be made almost any desired value. Consequently the regulating apparatus can now very easily discriminate between the circulating current and the normal current in the feeders.

The addition of the shunt capacitors also produces the following advantages. The normal feeder power factor is improved, the normal voltage drop in the feeders is reduced, the current demand on the generators is decreased and the system losses are decreased.

In actual practice it is desirable to be able to disconnect a feeder from the network. The boxes 10 represent feeder circuit breakers provided for this purpose.

While I have shown and described a particular embodiment of my invention, it will be obvious to those skilled in the art that changes and modifications can be made therein and I aim in the appended claims to cover all such changes and modifications as fall within the true spirit and scope of my invention.

What I claim as new and desire to secure by Letters Patent of the United States, is:

1. In combination, an alternating current distribution system including a plurality of electrically parallel feeder circuits, automatic voltage regulating means for each of said feeder circuits, separate current responsive compensating means for causing each of said regulating means to lower the voltage in response to relatively low power factor lagging current and to raise the voltage in response to relatively high power factor lagging current, and means for increasing the phase angle between normal currents and abnormal circulating currents in said feeder circuit.

2. In combination, an alternating current distribution system including a plurality of electrically parallel feeder circuits, automatic voltage regulating means for each of said feeder circuits including line drop compensators having reverse reactance compensating elements, and an electrical condenser connected to said system so as to increase the phase angle between normal currents and abnormal circulating currents in said feeder circuit.

3. In combination, an electrical distribution network, a plurality of alternating current feeder circuits for said network, variable ratio transformers in said feeder circuits, voltage responsive means for controlling the ratio of said transformers so as to maintain substantially constant voltage on said network, line drop compensators for said voltage responsive means including reverse reactance compensating elements, and a capacitor connected to said network so as to increase the phase angle between normal currents and abnormal circulating currents in said feeder circuit.

4. In combination, an alternating current distribution system including a plurality of parallel alternating current feeder circuits, separate automatic voltage regulating means for each of said circuits, separate line drop compensating means for each of said voltage regulating means, each of said line drop compensating means having a reverse reactance compensation element so that said regulating means will lower the voltage level when the feeder currents are nearer 90° lagging than when they are in phase and raise the voltage level when the feeder currents are more nearly in phase than they are 90° lagging, said feeder circuit having a high ratio of resistance and reactance so that the current circulating therein as a result of a difference in voltage in said feeder circuits is relatively high in power factor, and means for increasing the phase angle between the circulating current in said feeder circuits and the normal load current in said feeder circuits comprising means for causing a leading current component of predetermined value to flow through said feeder circuit.

WILLARD J. McLACHLAN.